(12) United States Patent
Fogelberg

(10) Patent No.: US 11,648,500 B2
(45) Date of Patent: May 16, 2023

(54) VALVE, USE OF SUCH VALVE, SEPARATOR COMPRISING SUCH VALVE AND METHOD OF CLEANING A SEPARATOR BODY

(71) Applicant: Husqvarna AB, Huskvarna (SE)

(72) Inventor: Andreas Fogelberg, Söderköping (SE)

(73) Assignee: HUSQVARNA AB, Huskvarna (SE)

( * ) Notice: Subject to any disclaimer, the term of this patent is extended or adjusted under 35 U.S.C. 154(b) by 714 days.

(21) Appl. No.: 16/610,289

(22) PCT Filed: May 2, 2018

(86) PCT No.: PCT/EP2018/061134
§ 371 (c)(1),
(2) Date: Nov. 1, 2019

(87) PCT Pub. No.: WO2018/202674
PCT Pub. Date: Nov. 8, 2018

(65) Prior Publication Data
US 2021/0402339 A1    Dec. 30, 2021

(30) Foreign Application Priority Data
May 2, 2017 (SE) .................................... 1750526-4

(51) Int. Cl.
*B01D 46/86* (2022.01)
*B01D 50/20* (2022.01)
(Continued)

(52) U.S. Cl.
CPC ................ *B01D 46/86* (2022.01); *A47L 9/12* (2013.01); *A47L 9/16* (2013.01); *A47L 9/20* (2013.01);
(Continued)

(58) Field of Classification Search
CPC .... B01D 46/86; B01D 46/4272; B01D 46/71; B01D 50/20; B01D 2273/28;
(Continued)

(56) References Cited

U.S. PATENT DOCUMENTS 2,598,207 A   5/1952  Bailey et al.
3,083,943 A   4/1963  Stewart, Jr. et al.
(Continued)

FOREIGN PATENT DOCUMENTS

CN   101745284 A   6/2010
CN   102869861 A   1/2013
(Continued)

OTHER PUBLICATIONS

Swedish Search Report for Application No. 1750526-4 dated Dec. 1, 2017.
(Continued)

*Primary Examiner* — Dung H Bui
(74) *Attorney, Agent, or Firm* — Burr & Forman LLP

(57) ABSTRACT

The present disclosure provides a valve (123), comprising a channel body (1231) defining a bent channel space, an elastically flexible membrane (1233), which separates a control space (Sc) from a flow space (Sf) in the channel space, a control connection (1232), providing a fluid connection to the control space (Sc), The control space (Sc) is provided at a radially outermost portion (Co) of the channel space, as per a channel bending radius (Ro), such that the membrane (1233) is flexible between an open position, whereby a cross section of the flow space (Sf) is substantially that of the channel, and a closed position, whereby the membrane substantially seals against a radially innermost portion (Ci) of the channel, as per the channel bending (Continued)

radius (Ri). Use of the valve in a separator is disclosed, as well as a separator comprising such valve and a method of cleaning a separator body.

11 Claims, 3 Drawing Sheets

(51) Int. Cl.
| | | |
|---|---|---|
| *B01D 46/71* | (2022.01) | |
| *A47L 9/12* | (2006.01) | |
| *A47L 9/16* | (2006.01) | |
| *A47L 9/20* | (2006.01) | |
| *B01D 46/42* | (2006.01) | |
| *B08B 15/04* | (2006.01) | |

(52) U.S. Cl.
CPC ......... *B01D 46/4272* (2013.01); *B01D 46/71* (2022.01); *B01D 50/20* (2022.01); *B08B 15/04* (2013.01); *B01D 2273/28* (2013.01); *B01D 2279/55* (2013.01)

(58) Field of Classification Search
CPC ......... B01D 2279/55; A47L 9/12; A47L 9/16; A47L 9/20; B08B 15/04; F16K 7/10; F16K 7/123; F16K 31/1266
See application file for complete search history.

(56) References Cited

U.S. PATENT DOCUMENTS

| | | | |
|---|---|---|---|
| 3,397,860 A | 8/1968 | Bushmeyer | |
| 3,521,430 A | 7/1970 | Vanderlip et al. | |
| 3,714,951 A | 2/1973 | Lundman | |
| 3,732,888 A | 5/1973 | Convain et al. | |
| 4,006,754 A * | 2/1977 | Houston | F16K 31/12 251/298 |
| 4,157,899 A | 6/1979 | Wheaton | |
| 4,182,371 A * | 1/1980 | Moore | A01G 25/165 137/624.11 |
| 4,275,470 A | 6/1981 | Badger et al. | |
| 4,286,910 A * | 9/1981 | Conrad | B65G 53/4675 414/221 |
| 4,376,315 A | 3/1983 | Badger et al. | |
| 4,436,120 A * | 3/1984 | Josien | F16K 7/10 138/93 |
| 4,600,144 A * | 7/1986 | Zelczer | G05D 23/1934 165/218 |
| 4,742,956 A * | 5/1988 | Zelczer | F16K 7/10 236/46 R |
| 4,787,408 A * | 11/1988 | Twerdochlib | F16K 7/10 251/61.1 |
| 5,217,509 A | 6/1993 | Jansen | |
| 7,302,959 B2 * | 12/2007 | Gonia | F24F 11/75 92/92 |
| 8,672,617 B2 * | 3/2014 | Couston | F03B 3/186 415/207 |
| 2005/0045480 A1* | 3/2005 | Krumme | G05D 7/0635 204/600 |
| 2005/0229985 A1* | 10/2005 | Saxenfelt | A63B 41/02 138/93 |
| 2011/0315231 A1* | 12/2011 | Petrov | F16K 7/17 137/15.01 |
| 2012/0137467 A1* | 6/2012 | Treitz | A47L 9/20 15/347 |
| 2014/0366976 A1* | 12/2014 | Al Shammary | F16L 55/124 137/15.17 |
| 2016/0059161 A1 | 3/2016 | Heine et al. | |
| 2017/0369037 A1* | 12/2017 | Caillot | F16K 7/123 |

FOREIGN PATENT DOCUMENTS

| | | | |
|---|---|---|---|
| CN | 203718025 U | 7/2014 | |
| CN | 105311890 A | 2/2016 | |
| CN | 206027184 U | 3/2017 | |
| DE | 1125243 B | 3/1962 | |
| EP | 0160030 B1 | 1/1988 | |
| EP | 1656872 A2 | 5/2006 | |
| EP | 2835089 A2 | 2/2015 | |
| JP | S57137774 A | 8/1982 | |
| JP | 58034274 A * | 2/1983 | ............... F16K 7/10 |
| WO | WO-9940266 A2 * | 8/1999 | ............ B01D 29/01 |
| WO | 2009041890 A2 | 4/2009 | |

OTHER PUBLICATIONS

International Search Report and Written Opinion for International Application No. PCT/EP2018/061134 dated Jul. 20, 2018.

* cited by examiner

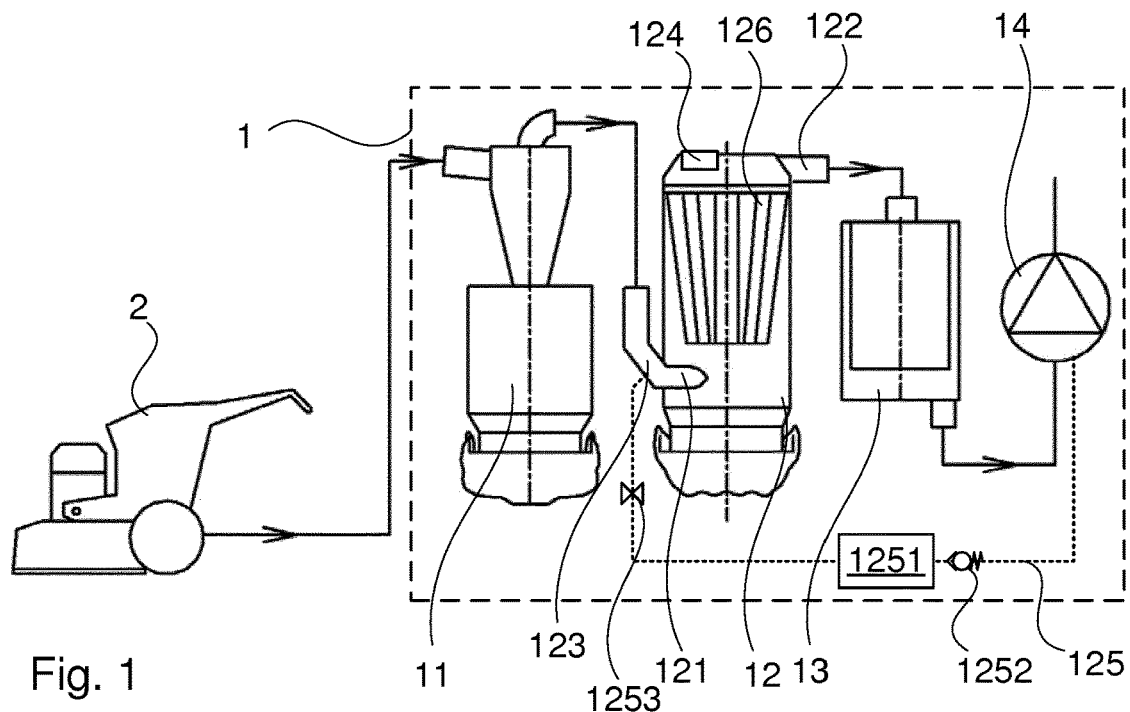
Fig. 1
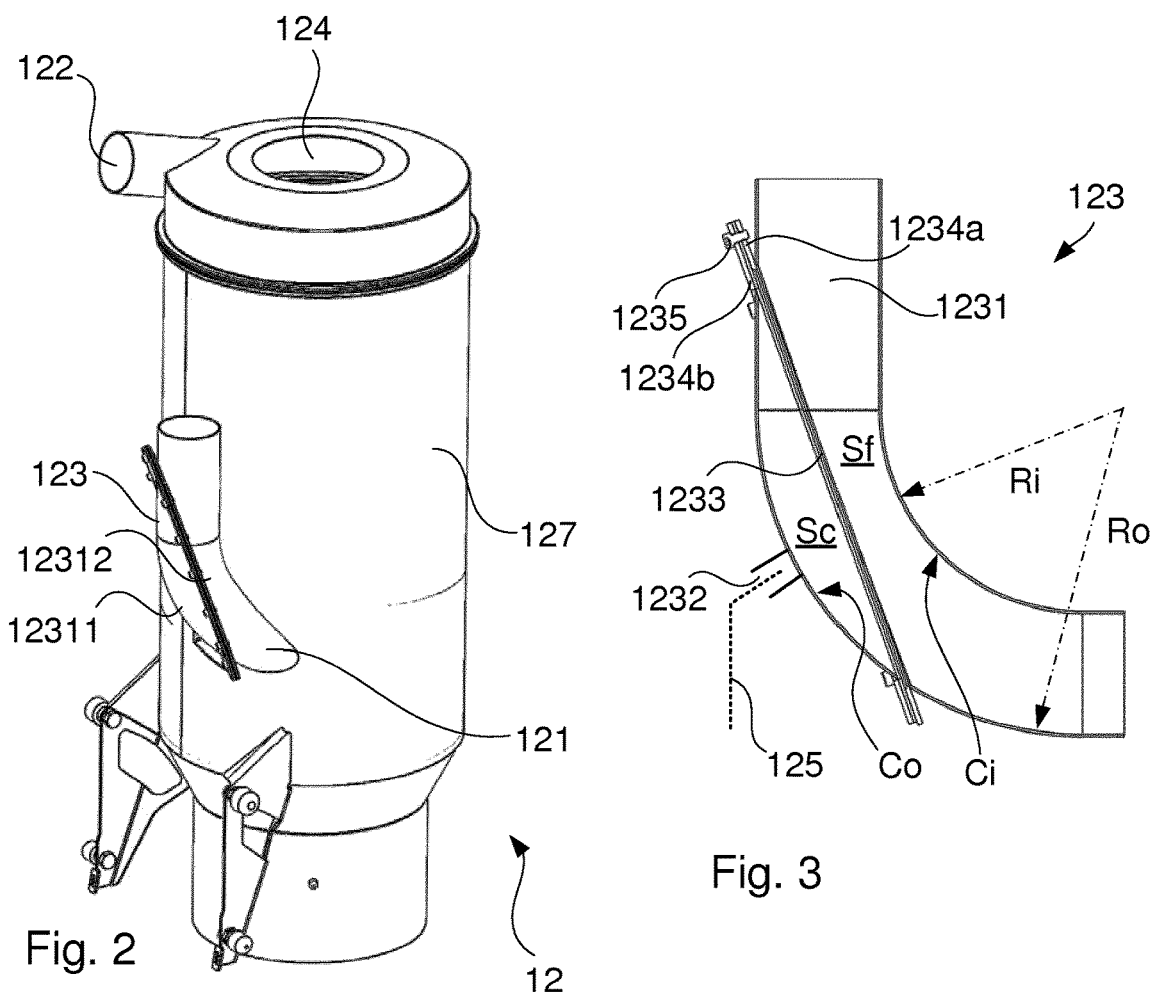
Fig. 2
Fig. 3

VALVE, USE OF SUCH VALVE, SEPARATOR COMPRISING SUCH VALVE AND METHOD OF CLEANING A SEPARATOR BODY

TECHNICAL FIELD

The present disclosure relates to a valve, to the use of such valve as an inlet valve for a separator, to a separator comprising such valve and to a method of operating a separator.

BACKGROUND

Separators are used for separating particles (including powder, granules, debris, etc.) from a flow of fluid, such as air, oil or water.

Some separators make use of a permeable separator body which traps the particles as the flow is directed through the separator body. The separator body may take the form of a grille, a net or a filter. A filter may comprise a woven or non-woven material.

As particles become trapped in the separator body, the separator body will gradually become clogged, leading to an increase in pressure drop over the filter, which affects the efficiency of the entire system.

Hence, it may be necessary to maintain the separator body, e.g. by exchanging it or by cleaning it.

In many applications, cleaning the separator body is the method of choice, as the separator body as such has a life which is substantially greater than the time it takes for it to clog.

There are various methods of cleaning the separator body, some of which include removing it from its place of operation, and others including cleaning the separator body in situ. The latter may involve various methods of scraping, striking or shaking the separator body.

A particular way of cleaning a separator body is by subjecting it to a reverse burst of the fluid. That is, fluid is caused to rapidly flow backwards through the separator body, whereby particles that are trapped on the separator body side which is upstream in normal operation are released from the separator body, and preferably collected.

In heavy duty separators for separating particles from air (essentially heavy duty "vacuum cleaners"), e.g. in connection with grinding of stone or concrete, a suction generator is normally arranged downstream of the separator, such that the suction generator draws air through the separator and thus through the separator body.

Such heavy duty separators may comprise a pre-separator, which may have the form of a settling chamber, coarse filter, a cyclone separator or a centrifugal separator, and a post-separator, such as a HEPA filter for separating out the finest particles not caught by the main separator. The suction generator would then typically be situated downstream of the post-separator.

In order to clean the separator body, the separator inlet is typically closed, while the suction generator is allowed to operate, such that an underpressure (vacuum) is built up inside the separator. Once the underpressure has been established, a valve at the downstream side of the separator body is quickly opened, connecting the downstream side of the separator body to higher pressure air, such as ambient air, whereby air will rush backwards through the separator body, cause agitation of the separator body and release particles caught on the upstream side of the separator body. If the separator body is sufficiently vertical, then the particles will drop to the bottom of the separator, where they may be collected and removed.

As an option, it is possible to provide an accumulated volume of pressurized air, which may be applied in the reverse direction of the separator body.

Hence, the cleaning procedure makes use of two valves: an inlet valve at the upstream side of the separator body and a cleaning valve on the downstream side of the separator body.

The inlet valve should provide sufficient shut-off of the incoming flow to the separator.

It is desirable to provide an inlet valve which is robust and which can be manufactured at low cost. Preferably, the inlet valve should also be easy to maintain and allow for automation. That is, it should be possible to operate the valve through numerical control, such that a cleaning operation can be entirely automated and initiated by a controller when needed or when ordered by an operator.

While inlet valves are discussed in e.g. WO2009041890A2, there is still room for improvement.

SUMMARY

It is an object of the present invention to provide an improved inlet valve, and in particular an inlet valve which at least partially meets the criteria set forth by way of introduction.

The invention is defined by the appended independent claims, with embodiments being set forth in the dependent claims, in the attached drawings and in the following description.

According to a first aspect, there is provided valve, comprising a channel body defining a bent channel space, an elastically flexible membrane, which separates a control space from a flow space in the channel space, and a control connection, providing a fluid connection to the control space. The control space is provided at a radially outermost portion of the channel space, as per a channel bending radius, such that the membrane is flexible between an open position, whereby a cross section of the flow space is substantially that of the channel, and a closed position, whereby the membrane substantially seals against a radially innermost portion of the channel, as per the channel bending radius.

The term "bent" should be understood as the channel portion providing a change of flow direction. The channel may thus be curved or angled. The term does not limit the way by which the bent channel portion is formed. That is, it may be originally formed as a bend, or it may be formed by bending a straight or pre-bent blank.

A channel cross section area may be on the order of 7-300 $cm^2$, preferably 7-200 $cm^2$, 20-170 $cm^2$ or 40-120 $cm^2$.

The channel cross section may be substantially constant. Circular channel cross sections may be preferred, but the flexibility of the membrane allows for use of other cross sections as well, as well as varying cross sections.

Numerical control possible by simple on/off valve controlling the pressure at the control connector, i.e. in the control space.

The membrane, which may be formed as a low cost replaceable part, will act as wear protection for the channel body.

The membrane may be formed from a material having rubber-elastic properties.

The membrane may be impermeable to the media which it is to operate in. However, it suffices if the membrane is sufficiently impermeable to allow an underpressure to be maintained in the control space A thickness of the membrane may be about 0.1-10 mm, preferably about 1-5 mm or about 1-3 mm.

The membrane may, in a relaxed position, i.e. where a pressure difference over the membrane is substantially zero, be substantially planar.

The membrane may, in the relaxed position, intersect the channel space, such that both the control space and the flow space have a volume greater than zero.

A ratio between the volume of the control space to the volume of the flow space may be on the order of 1/2 to 1/10, preferably 1/2-1/5.

The membrane may be molded to provide a non-planar form, such that the membrane, in a relaxed position, i.e. where a pressure difference over the membrane is substantially zero, is non-planar.

The membrane may be molded out of plane towards the control space.

Alternatively, the membrane may be molded out of plane towards the flow space.

The valve may further comprise a sectional cut-off portion from the channel body, whereby edges of the membrane are attached between the channel body and the cut-off portion.

The "cut-off portion" may be formed by actually cutting off a portion of the channel body, or by a portion formed separately to fit with the channel body as if it was cut off therefrom. Moreover, the cut-off portion may be formed as a wall portion that follows the channel wall and slightly overlaps with the channel wall.

Edges of the channel body and the cut-off portion may be provided with flanges.

The flanges may extend substantially parallel with a membrane plane.

The membrane may be clamped between the flanges

The membrane may be attached at an outer portion of the flanges, such that an inner portion of a membrane edge is movable between the flanges.

Alternatively, the membrane may be provided by a bladder, which is attached to a channel wall at the radially outermost portion of the channel space, the bladder enclosing the control space.

A membrane area inside the channel space may be at least 2 times a channel cross sectional area, preferably 3-7 times the channel cross sectional area.

According to a second aspect, there is provided use of a valve as described above as an inlet valve arranged on an upstream side of a separator for separating particles from a particle-laden fluid flow.

In such use, fluid may be drawn through the separator and thus through the valve by a suction generator arranged downstream of the separator.

In such use, the control connector may be in fluid connection with the suction generator at a point downstream of the separator, such that a pressure applied to the control connector is lower than a pressure applied to the channel. That is, a pressure differential is applied over the membrane.

In the use, the control connector may be connected to a separate pump device, arranged to supply a vacuum and/or a pressure to the control space.

The use may be for separating particles from particle-laden air.

According to a third aspect, there is provided a separator for separating particles from a particle-laden fluid flow, comprising a separator space, a suction generator, connected to a downstream side of the separator space, and a valve as described above, arranged at an upstream side of the separator space.

The control connector may be in fluid connection with the suction generator at a point downstream of the separator, such that a pressure applied to the control connector is lower than a pressure applied to the channel.

The separator may further comprise a separate pump device, arranged to supply a vacuum and/or a pressure to the control space.

The separator may further comprise an accumulator arranged to accumulate a vacuum and/or a pressure, and selectively connected to the control space, to apply said vacuum and/or pressure to the control space. Such accumulator may be charged by the suction generator and/or by a separate pump.

According to a fourth aspect, there is provided a method of cleaning a separator body housed in a separating space in a separator, comprising:

closing an inlet to the separating space, drawing an underpressure at a separator body downstream side, and connecting the separator body downstream side to a higher pressure than the underpressure, such that fluid flows rapidly in a reverse direction of the separator body. The inlet may be closed by means of a valve as described above being operated to assume its closed position.

The valve may be operated by increasing a pressure in the control space relative to a pressure in the separating space.

The pressure may be increased by connecting the control space with a pressure corresponding at least to an ambient pressure.

BRIEF DESCRIPTION OF THE DRAWINGS

FIG. 1 is a schematic drawing of a system comprising a floor grinding machine 2 and a heavy duty vacuum cleaner 1.

FIG. 2 is a schematic perspective view of a separator 12, which may form part of the vacuum cleaner 1.

FIG. 3 is a schematic cross sectional view of a valve 123 according to a first embodiment.

DETAILED DESCRIPTION

Figure 4A:
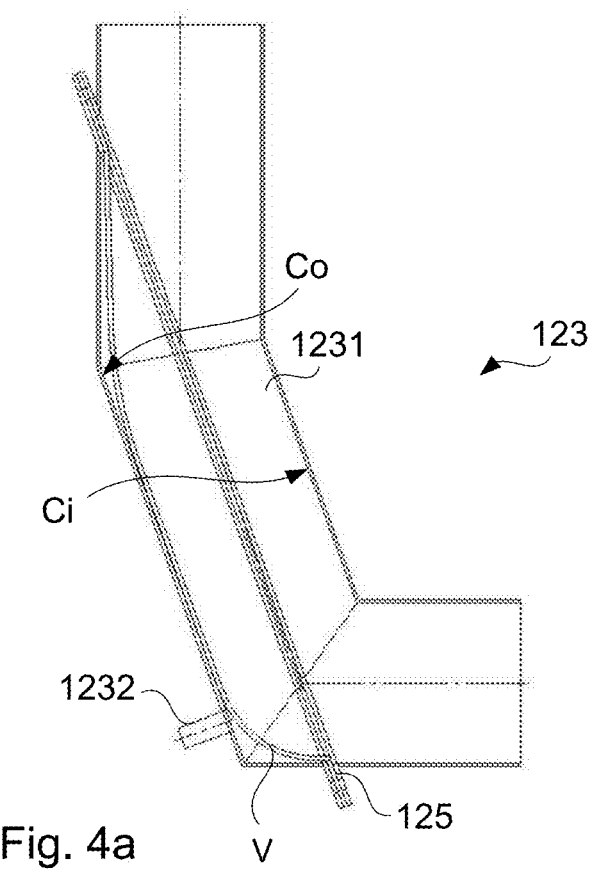
FIGS. 4a-4b are schematic cross sectional views of a valve 123 according to a second embodiment.

In the following description, the valve will be described with reference to its use in a separator that forms part of a heavy duty vacuum cleaner useful in a floor grinding context.

Referring to FIG. 1, a system comprises a floor grinding machine 1, which may be any type of floor grinding machine having a connection for evacuation of grinding residues. The system further comprises a heavy duty vacuum cleaner unit 1, which comprises a pre-separator 11 illustrated as a cyclone type separator; a main separator 12 comprising an inlet 121, an outlet 122, an inlet valve 123, a cleaning valve 124, and a separator body 126, such as a filter. The system further comprises a post-separator 13, such as a HEPA filter and a suction generator 14, which may comprise a motor driving a fan to create an airflow.

FIG. 2 schematically illustrates the separator 12 with the separator inlet 121, the outlet 122, the inlet valve 123 and a housing 127. The cleaning valve 124 is also visible at the top of the housing 127.

In the following, the valve 123 will be described with reference to use as an inlet valve in a heavy duty vacuum cleaner. It is understood that the same principles may be applied to other types and applications of separators.

Referring to FIG. 3, the valve 123 comprises a bent channel 1231, which defines a channel space, a membrane 1233, which divides the channel space into a flow space Sf and a control space Sc, and a control connection 1232.

In the illustrated embodiment, the channel is bent in the sense that it presents a bend having an inner bending radius Ri and an outer bending radius Ro. As seen from these bending radii, the channel 1231 has cross section, which, along the radial direction Ro of the bend extends from a radially innermost wall Ci portion to a radially outermost wall portion Co.

The cross section may, as illustrated in FIG. 3, be generally circular. However, other cross sections may be provided, including elliptic, square or rectangular ones.

The bend of the channel may be formed by bending a straight channel blank. Alternatively, the channel may be initially formed into bent configuration, e.g. based on a pre-cut sheet metal and/or using a mandrel providing such bent configuration.

Figure 4B:
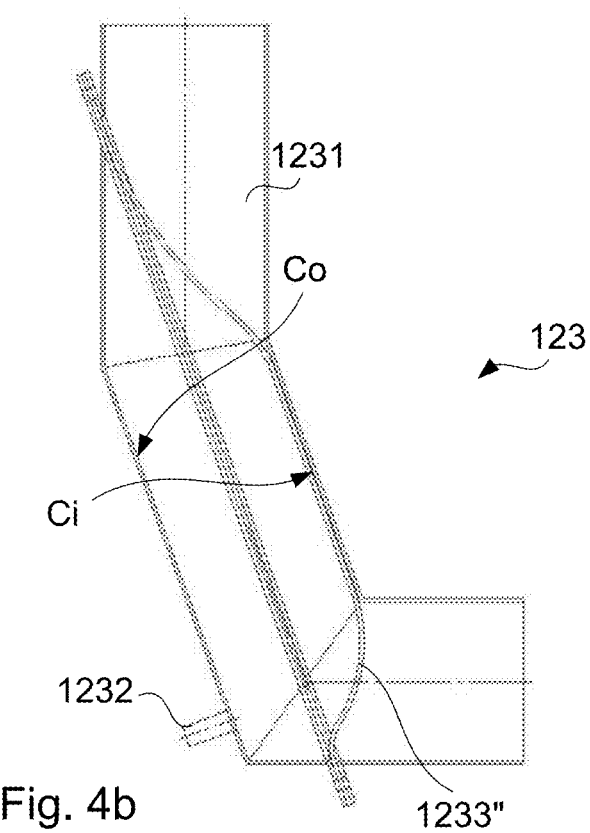

Alternatively, the channel 1231 may be bent in the sense that it comprises a change of flow direction. This may be the case where the channel is composed of two or more channel portions that are joined opening to opening to provide two or more channel angles, as illustrated in FIGS. 4a-4b.

The membrane 1233 is arranged such that it forms the control space Sc such that it is arranged at the radially outermost portion Co of the channel, as seen from the channel bend radius Ro, and sealed off from the flow space Sf.

For example, the membrane 1233 may, in a relaxed state, i.e. where the pressure in the control space Sc is equal to that in the flow space Sf, present a substantially planar form, thus forming a planar base of the control space Sc defined by the membrane and the channel wall Co.

Where the channel 1231 is formed as a bent pipe with circular cross section, the control space Sc will be delimited by the planar membrane 1233 and, in the case where the channels is bent into a curve and has a circular cross section, a double curved surface Co formed by the channel wall. In such case, control space will have a shape that is defined by the curve provided by the bend of the channel, as per the channel bending radius, and by the curve provided by the bend of the channel cross section outline. These curves may be mutually orthogonal.

The shape of this control space Sc will vary depending on the shape of the channel.

A control connection 1232 is provided to the control space Sc to allow for a vacuum to be drawn, or, optionally, a pressure to be applied. The control connection may be connected as a fluid connection 125 to the suction generator 14. As an alternative, the control connection may be connected to a separate pump for drawing a vacuum and/or for applying a pressure to the control space Sc.

The connection 125 between the connector 1232 and the suction generator 14 may be controlled by a valve 1253, which may be arranged to selectively connect the control space Sc to the suction generator 14 or to ambient pressure.

The membrane 1231 is formed of a flexible material, which is preferably elastic in the sense that the material is able to stretch and then return to its original shape.

The membrane 1231 is thus flexible, preferably elastically flexible, between a valve closed state, where a portion of the membrane contacts the radially innermost channel wall portion of the bend, to close off the flow space, and an open state, where the membrane contacts, and preferably follows, an outermost channel wall portion of the bend.

In the embodiment where the membrane 1231 is planar in its relaxed state, the membrane may be said to extend tangentially to one point of the channel bend.

The membrane 1231 may be formed of sheet material, which is sufficiently impermeable to such gases that are to be transported in the channel.

Hence, the membrane 1231 is sufficiently impermeable to maintain an open or closed state, respectively, respectively, of the valve.

Examples of materials comprise elastically flexible materials, such as rubber and rubber-like materials, A membrane thickness may be on the order of 0.1-10 mm, preferably 1-5 mm or 1-3 mm.

The membrane attachment in the channel may be implemented by a cutaway part 12311 of the radially outermost channel wall portion.

For example, a part 12311 of the channel wall may be cut away by a cut that may be planar. Along cut edges of the remaining channel 12312 and along cut edges of the cutaway part, there may be provided flanges 1234a, 1234b, which may be continuous along the edges or which may form separate attachment tongues.

The membrane 1233 may thus be arranged along the plane of the cut, and the cutaway portion 12311 repositioned and attached.

Flanges or attachment tongues, as described above, may be used for such attachment.

Flanges 1234a, 1234b of the channel cut edges and the edges of the cutaway part 12311 may be connected to each other by e.g. clamps, snap connection, screws or nut/bolt connections 1235.

The membrane 1233 may be clamped between the edges, or flanges, as the case may be.

Figure 5:
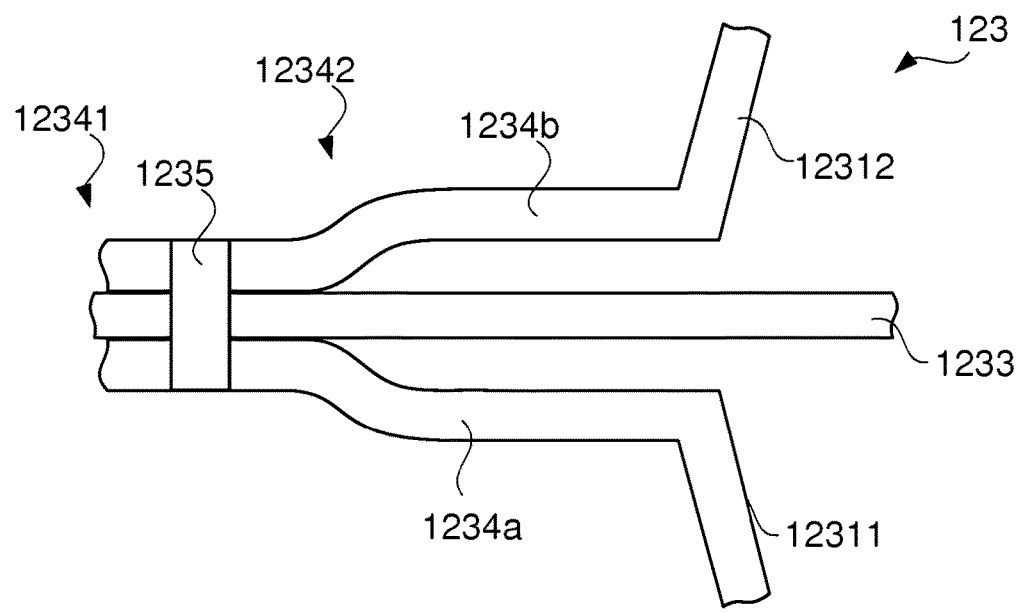
FIG. 5 schematically illustrates an embodiment of a membrane connection.

Referring to FIG. 5, for example, the membrane 1233 may be attached (such as clamped) to an outermost portion 12341 of the flanges 1234a, 1234b, spaced from the channel wall, such that the membrane is movable relative to an innermost portion 12342 of the flanges 1234a, 1234b, closest to the wall 12311, 12312. To this end, a distance between the flanges may taper outwardly from the channel wall. Hence, the membrane surface which is available for elastic deformation is increased.

In one set of alternative embodiments, the membrane may be out-of-plane molded. That is, instead of having a generally two-dimensional shape when relaxed, the membrane could have a three-dimensional shape when relaxed.

For example, in the relaxed position, the membrane could be formed towards the valve open position (FIG. 4a), whereby it would close, and optionally buckle, towards the radially innermost channel wall portion when the pressure is sufficiently higher in the control space Sc than in the flow space Sf.

In another embodiment, in the relaxed position, the membrane could be formed towards the valve closed position (FIG. 4b), whereby it would open, and optionally buckle, towards the radially outermost channel wall portion when the pressure is sufficiently higher in the flow space Sf than in the control space Sc.

The control connection 1232 provides a fluid connection with the control space Sc, such that the pressure in the control space Sc can be regulated. The connection may be provided by means of a through hole in the channel wall, optionally provided with a coupling member or other means by which a fluid connection may be established.

As another alternative, the connection may be provided in the joint between the cutaway channel wall part and the remaining channel wall.

Typically, this connection 1232 will be connected to the suction generator, such as to the same suction generator that generates the main suction in the separator 12. Hence, the connection may be provided by a hose connecting to a point in the air path downstream of the separator 12 and upstream of the suction generator 14.

It is possible, of course, to apply pressurized fluid to the connection, if desired and if available.

The valve 123 will typically be arranged at or near an inlet for dust-laden air to a separator housing 127.

The operation of the valve 123 will now be described.

In normal operation of the valve 123, a suction force is provided at a downstream side of the separator, and preferably even at a downstream side of a post-separator 13, such as a HEPA filter.

This suction force will thus draw air through the system 1, such that dust-laden air is drawn in via a system inlet, optionally pre-separated and then led through the valve 123, into the separator 12, where at least some of the dust is trapped by a filter body 126. The thus cleaned (but not necessarily entirely clean) air exits the separator 12, optionally enters a post-separator 13 and then is drawn into the suction generator 14, after which it may be expelled to the ambient environment.

During such normal operation, a suction force is applied to the control connection 1232, as described above. By connecting the control connection 1232 to the suction generator 14 downstream of the separator, the difference in pressure drop will make sure the pressure is always lower in the control space Sc than in the flow space Sf, whereby the membrane 1233 will assume the open position.

Preferably, the membrane 1233 may be drawn all the way to the channel outermost wall portion Co, such that it provides a minimum of hindrance to the flow in the channel.

A determination of a need to clean the filter may be made by the user, e.g. as it is discovered that the overall suction efficiency is reduced. Alternatively, it may be determined automatically, e.g. by measuring a pressure difference over the separator 12, or by measuring a motor parameter indicating that the system resistance is increasing. As yet another alternative, cleaning may be effected at predetermined time intervals.

As a first action, the valve 123 will be actuated, either by simply turning off the suction at the control space Sc, by connecting the control space to ambient pressure, or by connecting the control space to a source of pressurized air.

When the pressure in the control space Sc is sufficiently larger than that in the flow space, the membrane 1233 will shift towards the radially innermost wall portion Ci of the channel to close off the flow.

The suction generator 14 continues to draw a vacuum in the separator housing 127.

Once a sufficiently low pressure has been achieved, a cleaning valve 124 at a downstream side of the filter is actuated to connect to air of higher pressure, such as ambient air, to provide a reverse air burst through the separator body 126, such that the separator is cleaned. In the case where the separator body is sufficiently flexible, agitation of the separator body 126 may be achieved. The cleaning valve 124 may then be closed, and the procedure repeated as many times as desired.

Once the cleaning is determined to be completed, the suction generator 14 is again applied to the control space Sc, whereby the membrane 1233 is drawn towards the open position and normal operation may resume.

Figures 6A, 6B:
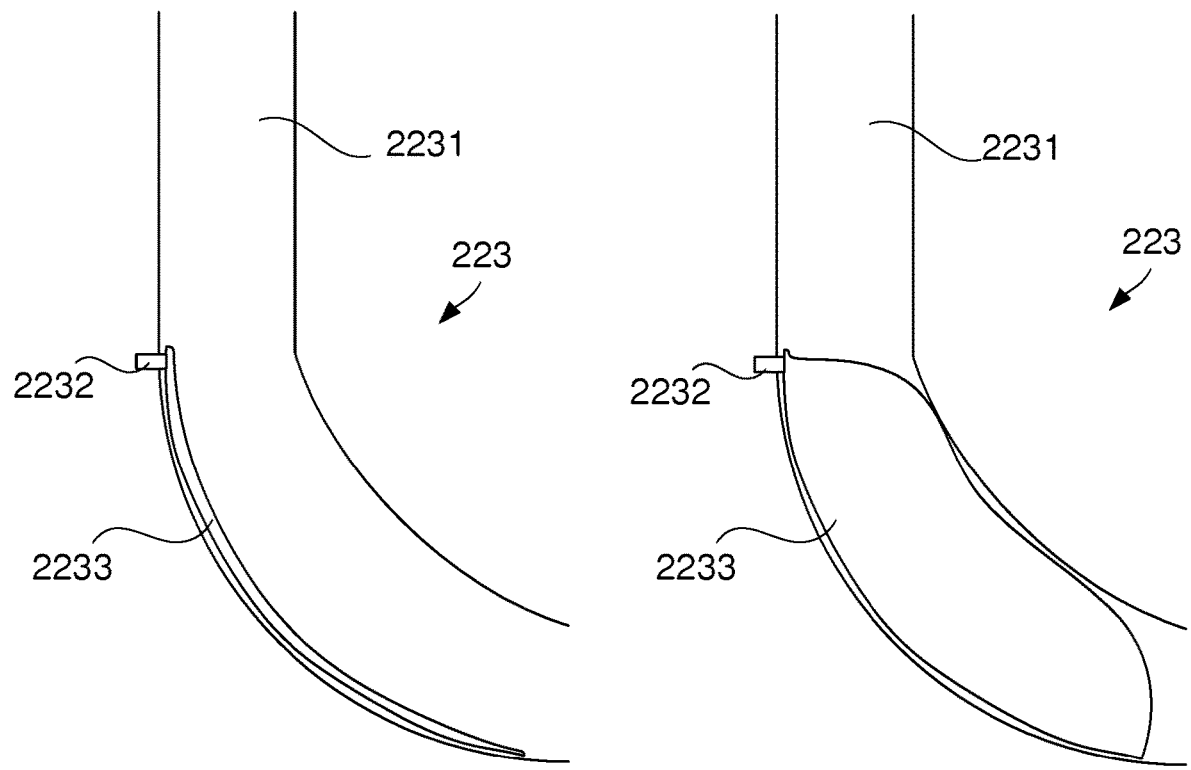
FIGS. 6a-6b schematically illustrate another embodiment of a valve 223.

Referring to FIGS. 6a-6b, there is illustrated an alternative embodiment of a valve 223, wherein the membrane is formed by a bladder 2233, which encloses the control space Sc and which may be attached to the radially outer wall as illustrated in FIG. 6a, such that it, in its collapsed state essentially follows this wall. When the pressure differential over the membrane shifts such that the pressure in the flow space is lower than that in the control space Sc, the bladder will expand and contact the radially inner wall, as illustrated in FIG. 6b.

The bladder may be attached to the outer wall by adhesive and/or mechanically (by rivets, bolts, etc.) by means of e.g. a flange provided along a bladder edge.

The bladder may be attached to an inner wall of the channel, or to a removable portion of the wall, such as the cut-off portion described before. It is understood that edges of the bladder may be clamped between the flanges of such cut-off portion arrangement.

Moreover, the radially outer portion of the bladder may be formed of a rigid material, which may be adapted to follow the shape of the channel wall, and to seal against it, while the portion facing the flow space has the form of a flexible membrane, as described above.

Optionally, an accumulator 1251 may be provided between the suction generator 14 and the control connection 1232. By allowing the suction generator 14 to operate via the accumulator 1251 and a non-return valve 1252, it is possible to accumulate a vacuum so that a faster response time for the valve 123 may be provided when it is desired to open the valve.

The connection 125 between the connector 1232 and the suction generator 14 may be controlled by the valve 1253, which may be arranged to selectively connect the control space Sc to the accumulator 1251 or to ambient pressure.

Analogously, it is possible to accumulate a pressure, e.g. in a separate accumulator, and apply this pressure to the control space Sc so as to achieve a rapid closing of the valve. A pressure accumulator may be driven by a separate pump, or via an outlet of the suction generator 14. A valve (not shown) may be arranged to control the connection between such pressure accumulator and the control space Sc.

The accumulator may be formed by a hollow chassis of the machine. That is, vacuum, or pressure, may be stored inside e.g. hollow beams forming the machine chassis.

In one embodiment, the cutoff portion may be formed from a transparent material, such that the membrane may be inspected while in operation.

The invention claimed is:

1. A valve, comprising:
   a channel body defining a bent channel space,
   an elastically flexible membrane, which separates a control space from a flow space in the channel space, wherein the membrane intersects the bent channel space such that both the control space and the flow space have a volume greater than zero when the membrane is in a relaxed position where a pressure difference over the membrane is zero, and
   a control connection providing a fluid connection to the control space, wherein the control space is provided at a radially outermost portion of the bent channel space,
such that the membrane is flexible between an open position, whereby a cross section of the flow space has a large area, and a closed position, whereby the membrane seals against a radially innermost portion of the bent channel space.

2. The valve as claimed in claim 1, wherein the membrane is formed from a material having rubber-elastic properties.

3. The valve as claimed in claim 1, wherein the membrane, in the relaxed position is planar.

4. The valve as claimed in claim 1, wherein the membrane is molded to provide a non-planar form, such that the membrane, in the relaxed position is non-planar.

5. The valve as claimed in claim 4, wherein the membrane is molded out of plane towards the control space.

6. The valve as claimed in claim 4, wherein the membrane is molded out of plane towards the flow space.

7. The valve as claimed in claim 1, further comprising a sectional cut-off portion from the channel body, whereby edges of the membrane are attached between the channel body and the cut-off portion.

8. The valve as claimed in claim 7, wherein edges of the channel body and the cut-off portion are provided with flanges.

9. The valve as claimed in claim 8, wherein the membrane is clamped between the flanges.

10. The valve as claimed in claim 8, wherein the membrane is attached at an outer portion of the flanges, such that an inner portion of a membrane edge is movable between the flanges.

11. The valve as claimed in claim 1, wherein a membrane area inside the channel space is at least twice a channel cross sectional area.

* * * * *

UNITED STATES PATENT AND TRADEMARK OFFICE
CERTIFICATE OF CORRECTION

PATENT NO. : 11,648,500 B2  
APPLICATION NO. : 16/610289  
DATED : May 16, 2023  
INVENTOR(S) : Andreas Fogelberg It is certified that error appears in the above-identified patent and that said Letters Patent is hereby corrected as shown below:

In the Claims

In Column 9, Claim 1, Line 5, "a large area" should read --a largest area--

Signed and Sealed this
Twenty-seventh Day of June, 2023

Katherine Kelly Vidal
*Director of the United States Patent and Trademark Office*